(12) United States Patent
Leys

(10) Patent No.: US 12,117,106 B2
(45) Date of Patent: Oct. 15, 2024

(54) FLUID CIRCUIT WITH INTEGRATED ELECTROSTATIC DISCHARGE MITIGATION

(71) Applicant: ENTEGRIS, INC., Billerica, MA (US)

(72) Inventor: John A. Leys, Chaska, MN (US)

(73) Assignee: ENTEGRIS, INC., Billerica, MA (US)

( * ) Notice: Subject to any disclaimer, the term of this patent is extended or adjusted under 35 U.S.C. 154(b) by 230 days.

(21) Appl. No.: 17/838,024

(22) Filed: Jun. 10, 2022

(65) Prior Publication Data

US 2022/0307634 A1    Sep. 29, 2022

Related U.S. Application Data

(63) Continuation of application No. 16/099,133, filed as application No. PCT/US2017/035213 on May 31, 2017, now Pat. No. 11,384,879.

(Continued)

(51) Int. Cl.
*F16L 25/01* (2006.01)
*B01D 39/16* (2006.01)
(Continued)

(52) U.S. Cl.
CPC .......... *F16L 25/01* (2013.01); *B01D 39/1692* (2013.01); *B01D 63/067* (2013.01);
(Continued)

(58) Field of Classification Search
CPC .......... F16L 25/01; F16L 9/125; F16L 11/127
See application file for complete search history.

(56) References Cited

U.S. PATENT DOCUMENTS

| | | | |
|---|---|---|---|
| 2,320,367 A | * | 6/1943 | Leathers ............... F16L 11/127 15/314 |
| 2,347,897 A | * | 5/1944 | Febrey ..................... H01R 4/64 439/192 |

(Continued)

FOREIGN PATENT DOCUMENTS

| | | |
|---|---|---|
| CH | 707521 A2 | 7/2014 |
| CN | 201362369 Y | 12/2009 |

(Continued)

*Primary Examiner* — Zachary T Dragicevich
*Assistant Examiner* — James A Linford

(57) ABSTRACT

A flow path for a fluid from a fluid supply which may include a plurality of operative components including a body portion and a plurality of tubing connector fittings. The operative components may be connected by a plurality of tubing segments. Each body portion may include a nonconductive fluoropolymer portion and an outer conductor that extends between each of the plurality of tubing connector fittings and that is unitary with the non-conductive fluoropolymer portion. The plurality of tubing segments may include a non-conductive fluoropolymer tubing portion and an axial strip of conductive polymer. The outer conductor of each body portion conductively connected with tubing segments connected thereto. Each of the connectors may include a bridging component for conductively connecting the respective outer conductor of the body portion to the strip of conductive polymer of the connecting tubing segments.

15 Claims, 13 Drawing Sheets

Related U.S. Application Data

(60) Provisional application No. 62/344,168, filed on Jun. 1, 2016, provisional application No. 62/344,171, filed on Jun. 1, 2016.

(51) Int. Cl.

| | | |
|---|---|---|
| *B01D 63/06* | (2006.01) | |
| *B01D 67/00* | (2006.01) | |
| *B01D 69/10* | (2006.01) | |
| *B01D 71/32* | (2006.01) | |
| *F16L 47/04* | (2006.01) | |

(52) U.S. Cl.
CPC ....... *B01D 67/0088* (2013.01); *B01D 69/107* (2022.08); *B01D 71/32* (2013.01); *F16L 47/04* (2013.01); *B01D 2201/50* (2013.01); *B01D 2239/0241* (2013.01); *B01D 2239/0478* (2013.01); *B01D 2239/0654* (2013.01); *B01D 2313/44* (2013.01); *B01D 2325/26* (2013.01)

(56) References Cited

U.S. PATENT DOCUMENTS

| | | |
|---|---|---|
| 3,753,205 A | 8/1973 | Tuger |
| 4,127,840 A | 11/1978 | House |
| 4,215,384 A | 7/1980 | Elson |
| 4,368,348 A | 1/1983 | Eichelberger |
| 4,675,780 A | 6/1987 | Barnes |
| 5,154,453 A | 10/1992 | Nishio |
| 5,506,047 A | 4/1996 | Hedrick |
| 5,672,832 A | 9/1997 | Cucci |
| 5,678,435 A | 10/1997 | Hodson |
| 5,869,766 A | 2/1999 | Cucci |
| 5,957,713 A | 9/1999 | Engle |
| 6,012,336 A | 1/2000 | Eaton |
| 6,179,132 B1 | 1/2001 | Moya |
| 6,409,222 B1 | 6/2002 | Donoho |
| 6,412,832 B1 | 7/2002 | Donoho |
| 6,428,729 B1 | 8/2002 | Bhatt |
| 6,595,240 B2 | 7/2003 | Leys |
| 6,601,879 B2 | 8/2003 | Donoho |
| 6,612,175 B1 | 9/2003 | Peterson |
| 6,652,008 B2 | 11/2003 | Fischer |
| 6,758,104 B2 | 7/2004 | Leys |
| 6,776,440 B2 | 8/2004 | Nishio |
| 6,789,781 B2 | 9/2004 | Johnson |
| 7,063,304 B2 | 6/2006 | Leys |
| 7,308,932 B2 | 12/2007 | Doh |
| 7,347,937 B1 | 3/2008 | Cheng |
| 7,383,967 B2 | 6/2008 | Gibson |
| 7,833,419 B2 | 11/2010 | Doucoure |
| 8,561,855 B2 | 10/2013 | Hennen |
| 8,689,817 B2 | 4/2014 | Leys |
| 8,726,935 B2 | 5/2014 | Leys |
| 2003/0021929 A1 | 1/2003 | Takahashi |
| 2004/0245169 A1 | 12/2004 | Breusch |
| 2005/0236110 A1 | 10/2005 | Bhatt |
| 2006/0099843 A1 | 5/2006 | Fullner et al. |
| 2006/0125233 A1 | 6/2006 | Cantrell |
| 2010/0018925 A1 | 1/2010 | Doucoure |
| 2014/0202946 A1 | 7/2014 | Asami |

FOREIGN PATENT DOCUMENTS

| | | |
|---|---|---|
| CN | 103982338 B | 5/2017 |
| DE | 202010017917 U1 | 2/2013 |
| DE | 102012112563 A1 | 6/2013 |
| EP | 0160168 B1 | 5/1989 |
| EP | 0723143 A1 | 7/1996 |
| EP | 1191268 A1 | 3/2002 |
| EP | 2273174 A2 | 1/2011 |
| JP | 06249380 A | 9/1994 |
| JP | 2002081580 A | 3/2002 |
| JP | 2003278972 A | 10/2003 |
| JP | 2006269677 A | 10/2006 |
| JP | 3172739 U | 1/2012 |
| JP | 2016183697 A | 10/2016 |
| WO | 1993012281 A1 | 6/1993 |
| WO | 1997015375 A1 | 5/1997 |
| WO | 2004104465 A2 | 12/2004 |
| WO | 2006017147 A2 | 2/2006 |

\* cited by examiner

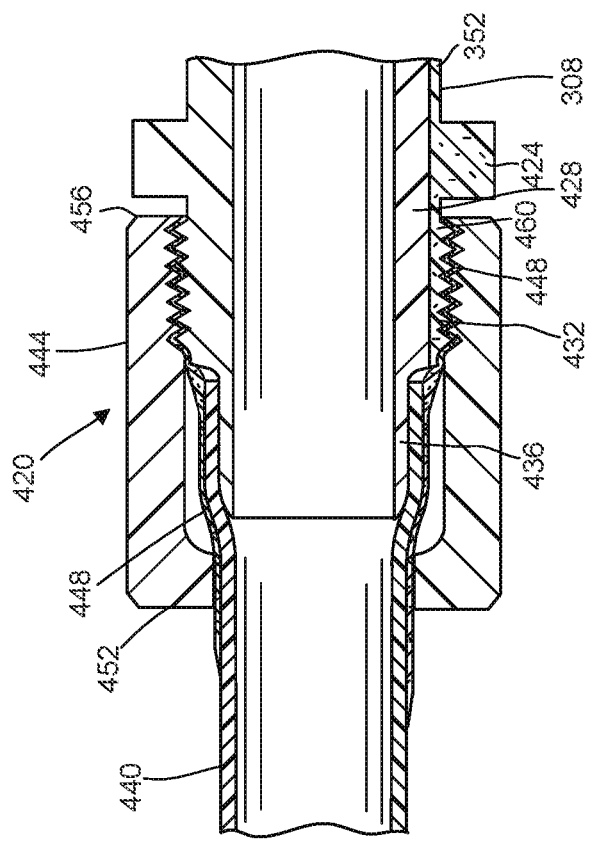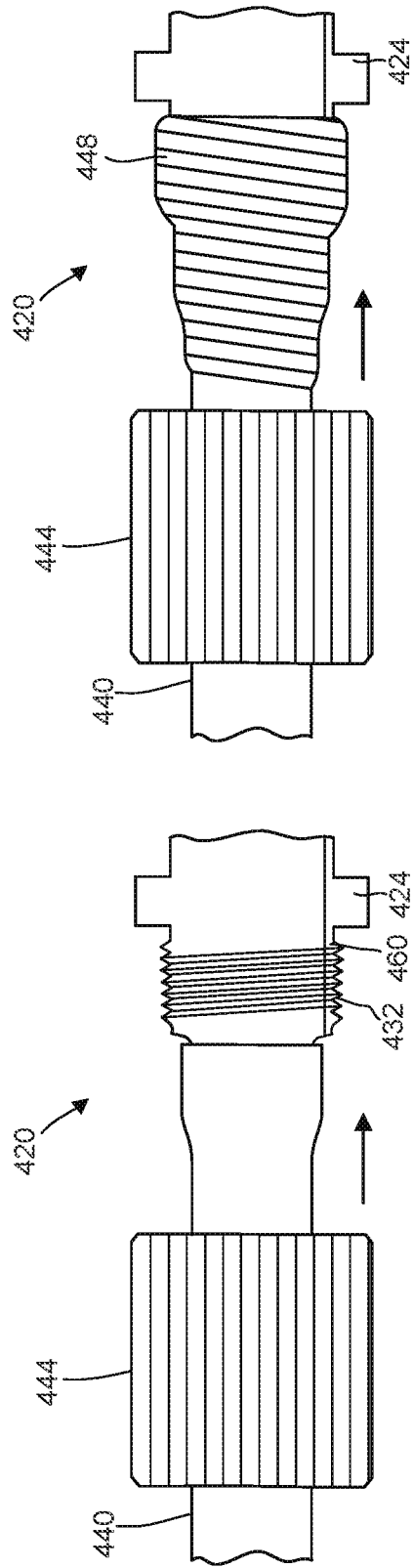

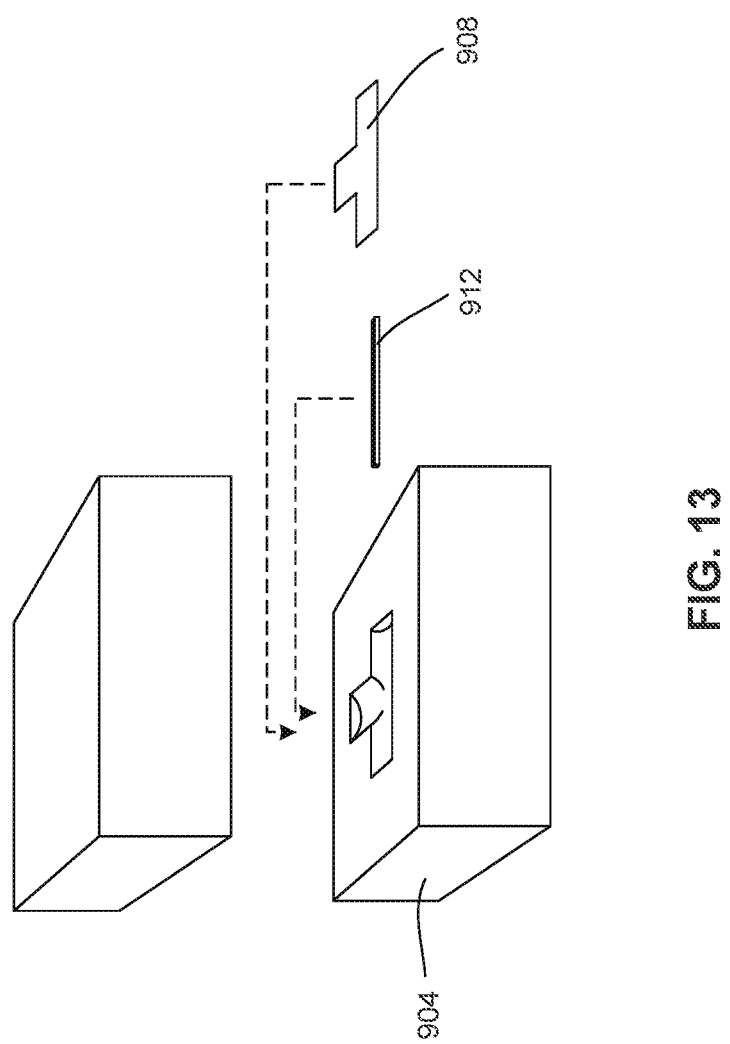

FLUID CIRCUIT WITH INTEGRATED
ELECTROSTATIC DISCHARGE
MITIGATION

RELATED APPLICATIONS

This application is a continuation of U.S. patent application Ser. No. 16/099,133, filed Nov. 5, 2018, which is the U.S. National Stage of International Application No. PCT/US2017/035213, filed May 31, 2017, which claims the benefit of U.S. Provisional Patent Application No. 62/344,171, filed 1 Jun. 2016, and U.S. Provisional Patent Application No. 62/344,168, filed 1 Jun. 2016, the disclosures of each of which are incorporated herein by reference in their entirety for all purposes.

TECHNICAL FIELD

Embodiments of the present disclosure are directed to fluid handling systems, and more specifically, to ultra-pure fluid handling systems with electrostatic discharge mitigation.

BACKGROUND

Fluid handling systems offering high purity standards have many uses in advanced technology applications. These applications include processing and manufacturing of solar panels, flat panel displays, and in the semiconductor industry for applications such as photolithography, bulk chemical delivery, and chemical mechanical polishing, wet etch, and cleaning. Furthermore, certain chemicals used in these applications are particularly corrosive, precluding the use of some conventional fluid handling technology due to possible corrosion of the fluid handling components and leaching of chemicals into the environment.

In order to meet the corrosion resistance and purity requirements for such applications, fluid handling systems provide tubing, fittings, valves, and other elements, that are made from inert polymers. These inert polymers include, but are not limited to, fluoropolymers such as, polytetrafluoroethylene (PTFE), perfluoroalkoxy alkane (PFA), ethylene tetrafluoroethylene (ETFE), and fluorinated ethylene propylene (FEP). In addition to providing a non-corrosive and inert construction, many fluoropolymers, such as PFA, are injection moldable and extrudable. Several types of connector fittings, made from such polymers, are available and are known, such as PRIMELOCK® fittings, PILLAR® fittings, flared fittings, and other fittings. Example fittings are illustrated by U.S. Pat. Nos. 5,154,453; 6,409,222; 6,412,832; 6,601,879; 6,758,104; and 6,776,440, each of which are incorporated herein by reference, except for express definitions and patent claims contained therein.

Electrostatic discharge (ESD) is another known issue for fluid handling systems in the semiconductor industry and in other technology applications. Frictional contact between fluid and surfaces of various operational components (e.g. piping, valves, fittings, filters, etc.) in the fluid system can result in generation of and buildup of static electrical charges. The extent of charge generation depends on various factors including, but not limited to, the nature of the components and the fluid, fluid velocity, fluid viscosity, fluid conductivity, pathways to ground, turbulence and shear in liquids, presence of free air in the liquid, and surface area. Furthermore, as the fluid flows through the system, the charge can be carried downstream in a phenomenon called a streaming charge, where charge can buildup beyond where the charge originated. Sufficient charge accumulations can cause discharges at the pipe walls, component surfaces, or even onto substrates or wafers at various process steps.

Substrates are highly sensitive and such discharges can result in damage or destruction of the substrate. For example, circuits on the substrate can be destroyed and photoactive compounds can be activated prior to regular exposure. Additionally, built up static charge can discharge from within the fluid handling system to the exterior environment, potentially damaging components in the plumbing (e.g. tubing, fittings, containers, filters, etc.), and leading to leaks, spills of fluid in the system, and diminished performance of components.

In some fluid handling systems, to reduce the buildup of static charges, certain components in fluid handling system are constructed are grounded to mitigates the buildup of static in the system as it continually disperses from the metal conductive components to ground.

For example, FIG. 1 depicts a fluid handling system 100 of the prior art. The system 100 provides a flow path for fluid to flow from a fluid supply 104 to one or more process stages 108 positioned downstream. As used herein, process stage 108 refers to a point of use for fluid in the system 100, or any intermediate point in the fluid handling system 100 where the fluid is utilized in a method or process. System 100 includes a fluid circuit 112 including a portion of the flow path from the fluid supply 104 to the one or more process stages 108. The fluid circuit 112 includes tubing segments 116 and a plurality of interconnected operative components 118 such as elbow shaped fitting 120, T-shaped fitting 122, a valve 124, filters 126 and flow sensor 128.

As used herein, tubing 116 refers to any flexible or inflexible pipe or tube that is suitable for containing or transporting fluid therethrough. Operative components refers to any component or device having a fluid input and a fluid output and that is mateable with tubing for directing or providing for the flow of fluid. Examples of operative components include, but are not limited to, fittings, valves, filters, pumps, mixers, spray nozzles, and dispense heads. These and additional non-limiting examples of operative components are illustrated by U.S. Pat. Nos. 5,672,832; 5,678,435; 5,869,766; 6,412,832; 6,601,879; 6,595,240; 6,612,175; 6,652,008; 6,758,104; 6,789,781; 7,063,304; 7,308,932; 7,383,967; 8,561,855; 8,689,817; and 8,726,935, each of which are incorporated herein by reference, except for express definitions or patent claims contained therein.

Tubing segments 116 are conductive, providing an electrical pathway along the length of each tubing segment 116 in the fluid circuit 112. Conductive tubing is primarily constructed from materials including metal or loaded polymeric material. Loaded polymeric material includes a polymer that is loaded with steel wire, aluminum flakes, nickel coated graphite, carbon fiber, carbon powder, carbon nanotubes, or other conductive material. In some instances, the tubing segments 116 are partially conductive, having a main portion constructed from non-conductive or low conductive material, such as perfluoroalkoxy alkane (PFA), or other suitable polymeric materials, and having a secondary unitary co-extruded conductive portion.

For example, fluid circuit 112, in certain instances, can utilize FLUOROLINE®, PFA tubing, available from Entegris Inc., the owner of this application. FLUOROLINE®, PFA tubing is primarily constructed from PFA with one or more conductive strips of carbon loaded polymer that is extruded along the length of the tubing at its exterior surface. A circuit diagram 132 is superimposed over the fluid circuit 112 that illustrates the electrical pathways provided by the conductive or partially conductive tubing segments 116.

Continuing to refer to Prior Art FIG. 1, in contrast to the tubing segments 116, the operative components 118 are each constructed primarily from non-conductive materials. For example, the operative components can be constructed from fluoropolymers including perfluoroalkoxy alkane (PFA), ethylene tetrafluoroethylene (ETFE), and fluorinated ethylene propylene (FEP), polytetrafluoroethylene (PTFE), and perfluoroalkoxy alkane (PFA). This occurs, for example, when system 100 is configured for use in ultra-pure fluid handling applications, where the tubing segments 116 and operational components 118 are typically constructed from polymeric materials to satisfy purity and corrosion resistance standards.

To mitigate static charge buildup, the tubing segments 116 may be electrically connected to ground 140 at various points in the fluid circuit 112 via some of the conductive straps 136. The conductive straps 136 disperse charge from the conductive strips running the length of the tubing 116 to ground 140. Additionally, sections of the tubing segments 116 may be electrically tied together via conductive straps 136 that bridge the electrical pathway across each of the non-conductive operative components 118. The conductive straps 136 are tied to the exterior of one or more of the tubing segments 116 and form an electrical connection with the conductive strips that run the length of each segment.

However, it would be desirable to improve static charge mitigation in ultra-pure fluid handling systems for improved component performance and reduction in potentially damaging ESD events.

SUMMARY

One or more embodiments of the disclosure are related to a fluid circuit in a fluid handling system. In one or more embodiments, the fluid circuit includes a plurality of operative components. In certain embodiments, each of the operative components includes a body portion with a fluid flow passageway therethrough and a pair of tubing connector fittings. In one or more embodiments, the body portion includes a unitary conductor portion extending between the connector fittings and displaced from the fluid flow passageway. In various embodiments, to provide a fluid passageway through the fluid circuit, the operative components are connectable together via one or more tubing segments that connect to the components at their respective tubing connector fittings. In one or more embodiments, the fluid passageway defines a portion of a flow path in the fluid handling system from a fluid supply toward a process stage.

Referring back to prior art FIG. 1, the non-conductive fittings 120, 122, valve 124, filters 126 and sensor 128 electrically isolate segments of the fluid circuit 112 by causing breaks in conductivity between tubing segments 116. Consequently, while tubing segments 116 are grounded, static charge still builds within each of the non-conductive operative components 118. For example, in an ultra-pure fluid handling system, a differential measured from the exterior of a PTFE fitting can reach nearly 30,000 volts. Similarly, in the filters 126, fluid friction from fluid passing through a filter membrane can cause a measurable voltage differential of nearly 30,000 volts. Any ESD events from this built up charge can result in damage to the fittings 120, 122, valve 124, filters 126, sensor 128 and other components in the fluid circuit 112. Such damage can lead to leaks or spills of fluid, reduced performance in filters 126, sensors 128 or other equipment, and/or ignition of flammable materials or chemicals in the plumbing or in the exterior environment.

Furthermore, the conductive straps 136 and electrical connections for bridging the operative components 118 and for grounding the fluid circuit 112 are required to be manually added. Depending on the number of fittings, valves, filters, sensors, and other non-conductive operative components in the system, the conductive straps 135 and bridging connections can require extensive time and labor to set up. For example, a fluid handling system configured for a wet etch and cleaning process can require nearly two hundred conductive straps to configure the system for ESD mitigation. Additionally, these connections need to be consistently checked and maintained. If one or more of the conductive straps 136 or electrical connections fail, the result is static charge buildup and ESD events which could damage the system 100.

Accordingly, one or more embodiments of the disclosure are directed to a fluid circuit with integrated ESD mitigation. In one or more embodiments, the fluid circuit includes a plurality of operative components each including a body portion with a fluid flow passageway therethrough and a pair of tubing connector fittings. In various embodiments, the operative components are connectable together via one or more tubing segments that connect to the components at their respective tubing connector fittings.

In certain embodiments, each body portion comprises a non-conductive fluoropolymer portion that defines the fluid flow passageway through the body portion and extends to ends of each of the pair of tubing connector fittings. In various embodiments, each body portion further includes an outer conductive pathway that extends between the tubing connector fittings and that is unitary with the non-conductive fluoropolymer portion.

In certain embodiments, the plurality of tubing segments each include a non-conductive fluoropolymer tubing portion and a strip of conductive polymer extending axially on and unitary with the non-conductive fluoropolymer tubing portion. The strip of conductive polymer of the tubing segment conductively connected to the conductive pathway of the body portion at the tubing connector fittings.

In one or more embodiments, each of the tubing connector fittings include a bridging component for conductively connecting the outer conductive pathway of the body portion to the strip of conductive polymer of the tubing portion connected to the respective tubing connector fitting. The bridging component formed of a conductive polymer and may be, for example, a nut, a sleeve, an O-ring or other shaped ring, and flexible thin wrap, such as tape.

A feature and advantage of the various embodiments is that each operative component has a conductive path that is integral and unitary with the nonconductive portions such that there is a gapless juncture between the conductive path and the nonconductive portions of the operative component. The gapless juncture minimizes accumulation of contaminants in cracks and provides a robust body portion of the operative component. In addition, such a gapless juncture provides a proximity to the fluid flow path that is closer than a comparable on the surface of the component conductive portion. A further feature and advantage is that the conductive portions of the operative components are not exposed at any wetted surfaces of the fluid flow circuit minimizing the possibility of contaminating the fluid flow stream with additives that provide the conductivity.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIGS. 7A-7C depict a tubing connector fitting and a tubing segment including a conductive tape, according to one or more embodiments of the disclosure.

FIG. 13 depicts a mold and overmolding materials for forming a body portion of an operative component, according to one or more embodiments of the disclosure.

Figure 1:
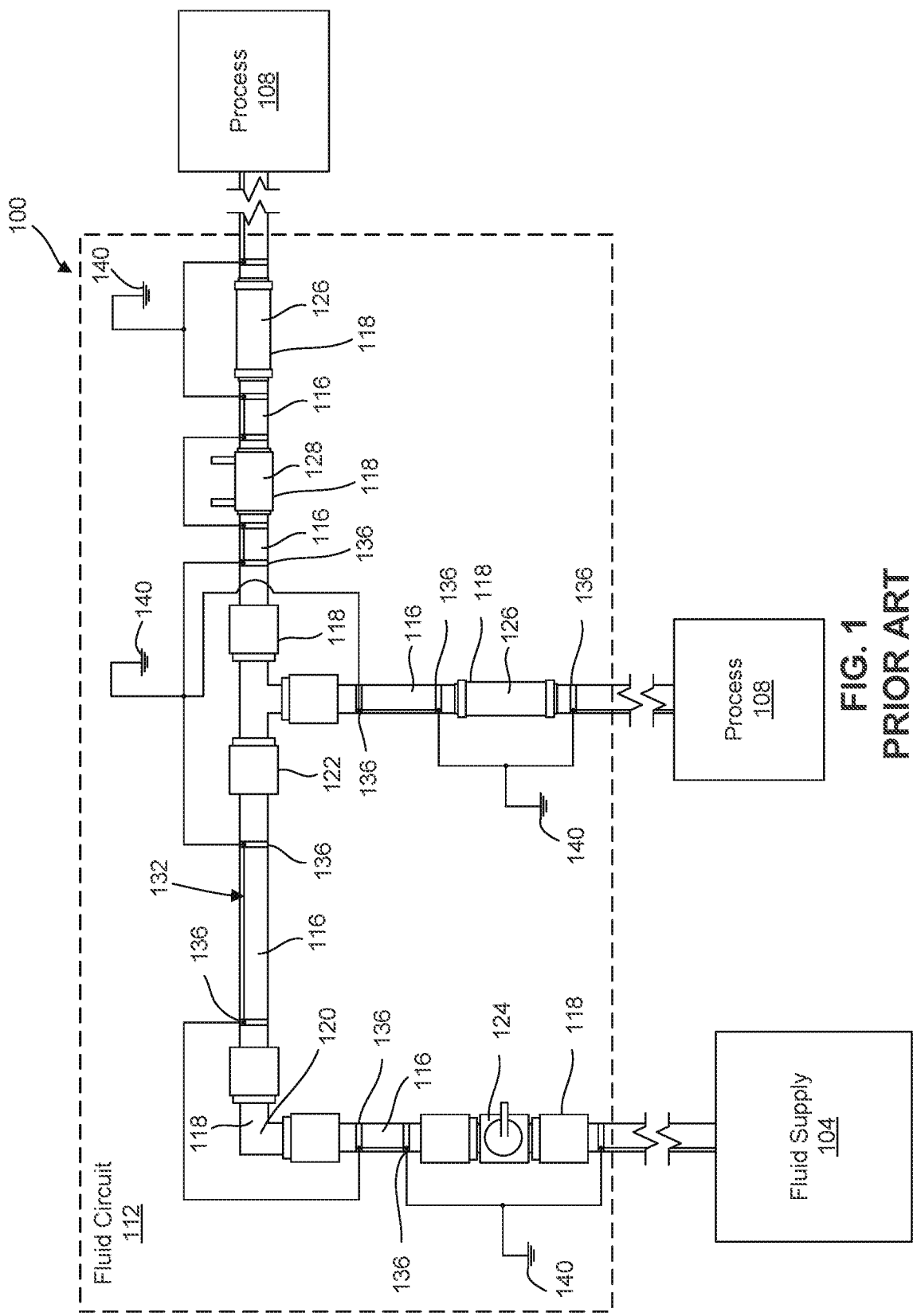
FIG. 1 depicts a fluid handling system of the prior art.

While the embodiments of the disclosure are amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

Figure 2:
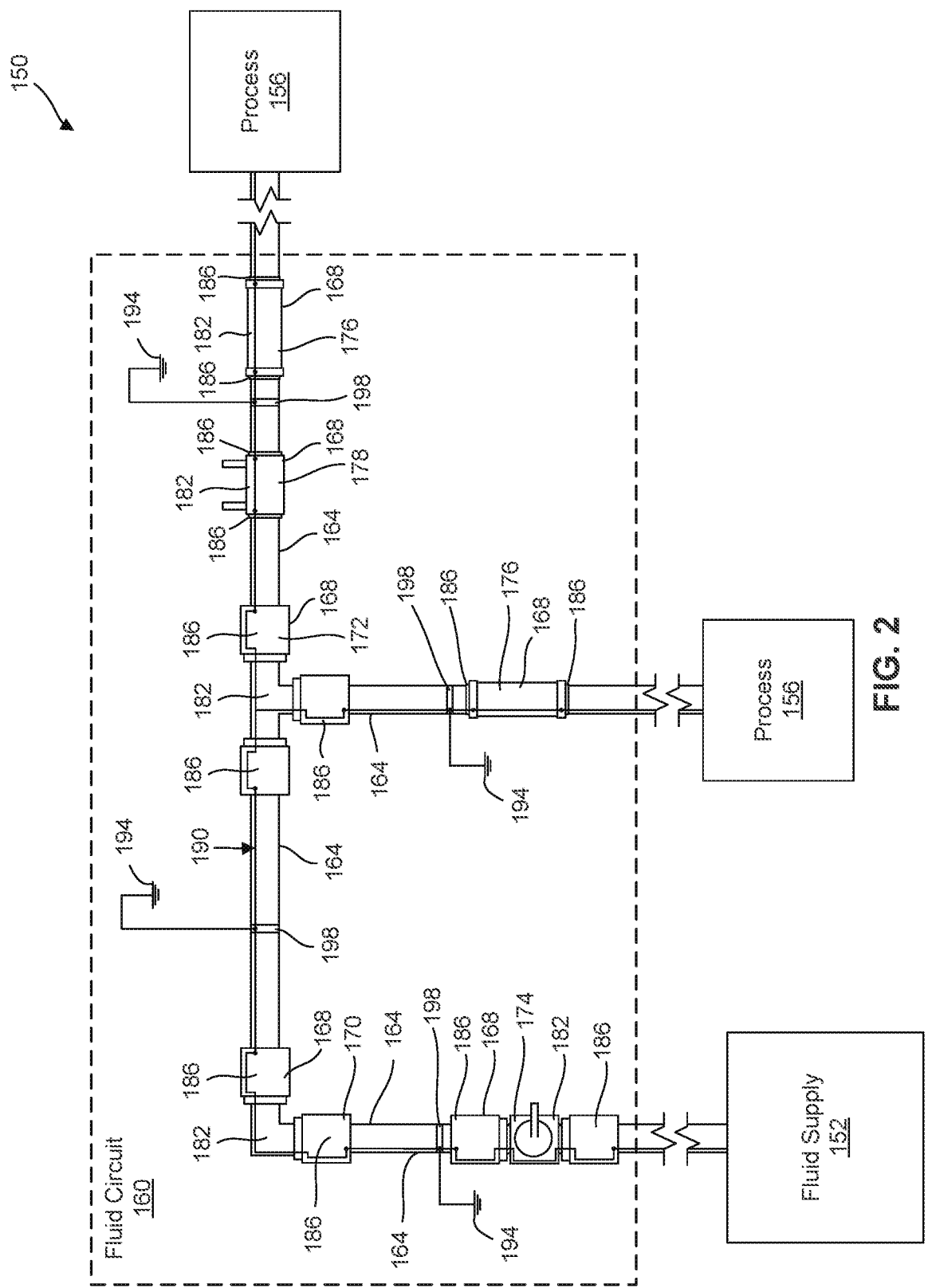
FIG. 2 depicts a fluid handling system and fluid circuit, according to one or more embodiments of the disclosure.

FIG. 2 depicts a fluid handling system 150 according to one or more embodiments of the disclosure. The system 150 provides a flow path for fluid to flow from a fluid supply 152 to one or more process stages 156 positioned downstream. System 150 includes a fluid circuit 160 which includes a portion of the flow path of the fluid handling system 150. The fluid circuit 160 includes tubing segments 164 and a plurality of operative components 168 that are interconnected via the tubing segments 164. Depicted in FIG. 2, the operative components 168 include an elbow shaped fitting 170, T-shaped fitting 172, a valve 174, filters 176 and flow sensor 178. However, in various embodiments the fluid circuit 160 can include additional or fewer operative components 168 in number and in type. For example, the fluid circuit 160 could substitute or additionally include pumps, mixers, dispense heads, sprayer nozzles, pressure regulators, flow controllers, or other types of operational components. In assembly, the operative components 168 are connected together by the plurality of tubing segments 164 connecting to the components 168 at their respective tubing connector fittings 186. Connected together, the plurality of tubing segments 164 and operative components 168 provide a fluid passageway through the fluid circuit 160 from the fluid supply 152 and toward the process stages 156.

In certain embodiments, the operational components 168 each include a body portion 182 that defines fluid flow passageway therethrough and one or more tubing connector fittings 186. In some embodiments, at least one of the tubing connector fittings 186 is an inlet portion for receiving fluid into the body portion 182 and at least another one of the tubing connector fittings 186 is an outlet portion for outputting fluid received via the inlet portion. For example, T-shaped fitting 172 includes one tubing connector fitting 186 that is an inlet portion that receives fluid from the fluid supply 152 and two tubing connector fittings 186 which are outlet portions outputting fluid toward the process stages 156. In certain embodiments, the inlet portion and the outlet portion are each connected or connectable to a tubing segment 164. However, in some embodiments, for example where the operative components 168 in the fluid circuit 160 includes a spray nozzle, only the inlet portion is required to be connectable to a tubing segment 164. In some embodiments one or more of the operative components 168 includes a single tubing connector fitting 186.

In various embodiments the body portion 182 is constructed using a non-conductive polymeric material. For example, the body portion 182 can be constructed from fluoropolymers including, but not limited to, perfluoroalkoxy alkane (PFA), ethylene tetrafluoroethylene (ETFE), fluorinated ethylene propylene (FEP), ethylene chlorotrifluoroethylene (ECTFE), and polytetrafluoroethylene (PTFE).

As shown in FIG. 2, each body portion 182 is additionally constructed using a conductive material to form an outer conductor portion that extends between and provides an electrical path between each of the tubing connector fittings 186. In various embodiments, the outer conductive pathway is unitary with the body portion 182 and is constructed from a conductive polymeric material. For example, in some embodiments the outer conductor portion is constructed from PFA loaded with conductive material (e.g. loaded PFA). This loaded PFA includes, but is not limited to, PFA loaded with carbon fiber, nickel coated graphite, carbon fiber, carbon powder, carbon nanotubes, metal particles, and steel fiber. In various embodiments, conductive materials have a resistivity level less than about $1 \times 10^{12}$ Ohms Per Square while non-conductive materials have a resistivity level greater than about $1 \times 10^{12}$ Ohms Per Square. In certain embodiments, conductive materials have a resistivity level less than about $1 \times 10^{9}$ Ohms Per Square while non-conductive materials have a resistivity level greater than about $1 \times 10^{9}$ Ohms Per Square.

Figure 3:
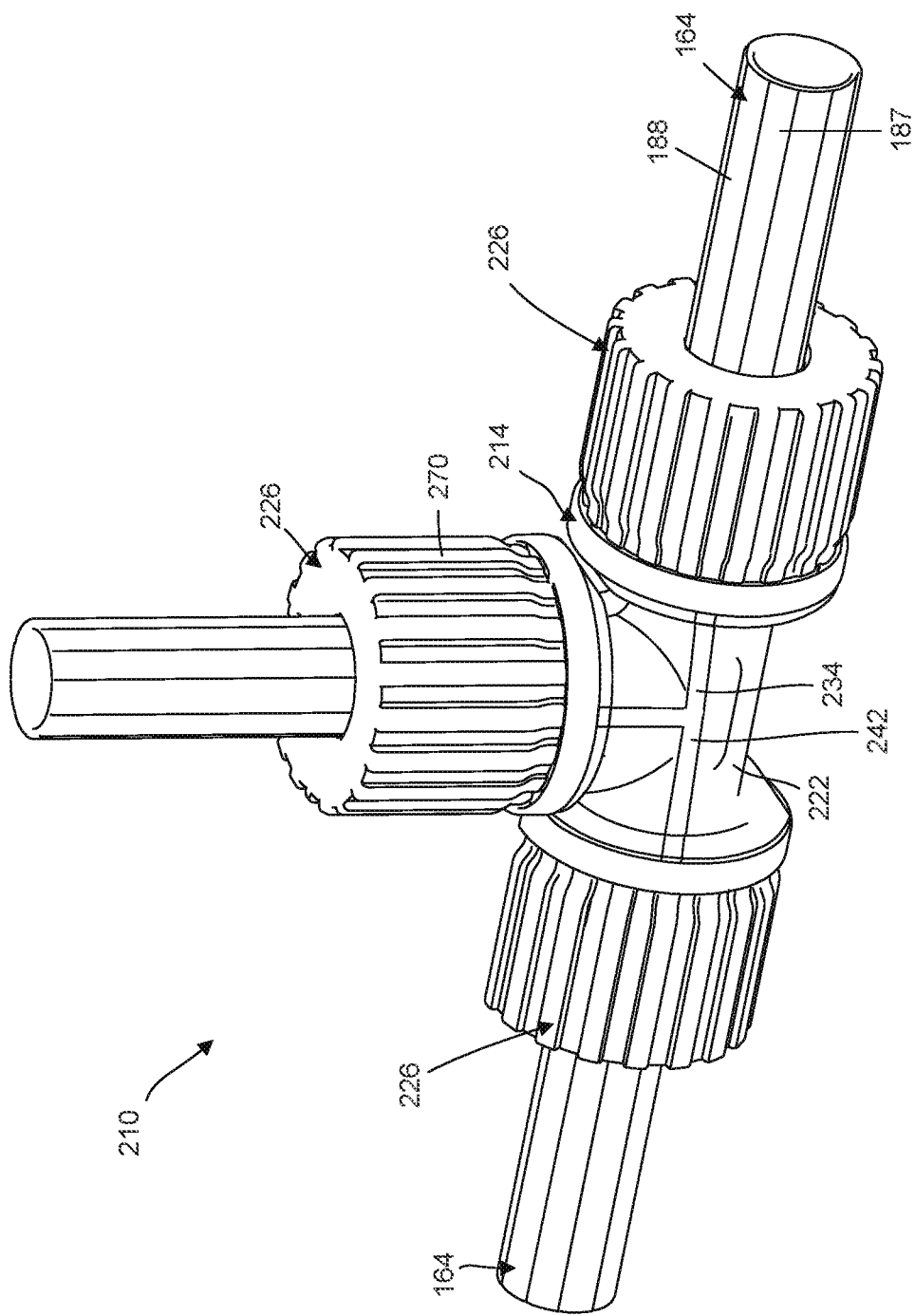
FIG. 3 depicts an operative component and connected tubing segments, according to one or more embodiments of the disclosure.
Figure 4:
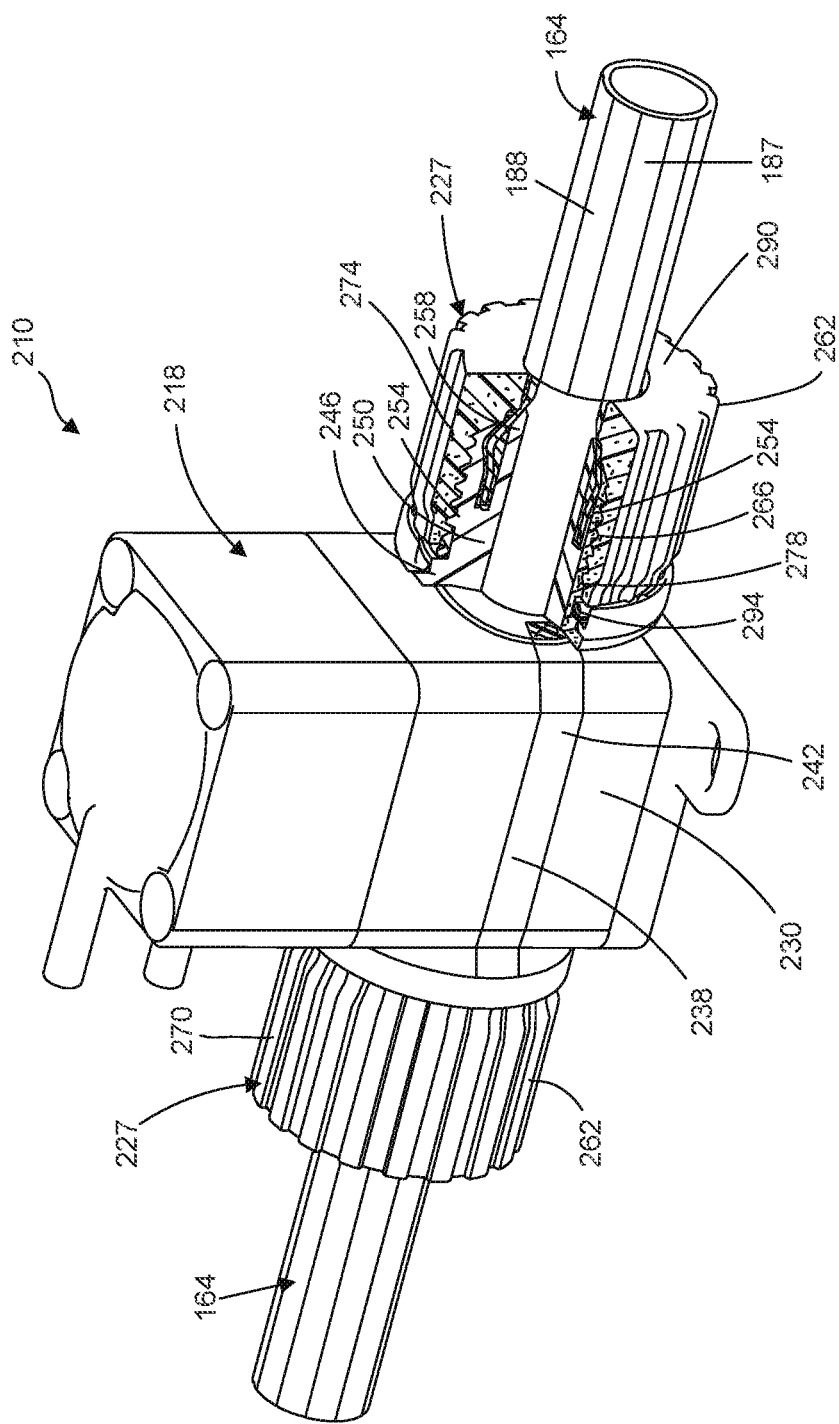
FIG. 4 depicts an operative component and partial cross-sectional view of a tubing connector fitting and tubing segment, according to one or more embodiments of the disclosure.

As depicted in FIGS. 3 and 4, tubing segments 164 are partially conductive, having a main portion or tubing portion 187 constructed from non-conductive or low conductive material and having a secondary portion or conductive portion 188 constructed from a conductive material that extends axially along the length of the tubing portion 187. For example, in some embodiments, tubing segments 164 each include a tubing portion 187 of a non-conductive fluoropolymer and conductive portion 188 formed as a strip of conductive polymer extending axially on and unitary with the non-conductive fluoropolymer main portion 187. In certain embodiments, tubing portion is constructed from PFA with the one or more conductive strips of the secondary portion constructed from carbon loaded PFA that is extruded along the length of each of the tubing segments 164 at or near its exterior surface. In some embodiments, the tubing segments 164 in the fluid circuit 160 are FLUOROLINE® tubing.

Referring again to FIG. 2, each of the operative components 168 includes a bridging component for conductively connecting the respective outer conductive pathway of the body portion 182 to the conductive portion 188 of the tubing segments 164 (shown in FIGS. 3 and 4) that are connected to the operative components 168. As such, in certain embodiments the connected operative components 168 and tubing segments 164 form an electrical pathway along the entirety of the fluid circuit 160, eliminating breaks in conductivity between the tubing segments 160. A circuit diagram 190 is superimposed over the fluid circuit 160 to illustrate the electrical pathway.

In certain embodiments, to mitigate static charge buildup, one or more of the tubing segments 164 and/or the operative components 168 are electrically connected to ground 194 via one or more conductive straps 198. The conductive straps 198 continuously disperse static charges as they build up in the fluid circuit 160 by providing a pathway to ground 194 from the electrical pathway.

FIGS. 3 and 4 depict example operative components 210 according to one or more embodiments of the disclosure. FIG. 3 depicts an operative component 210 that is a fitting 214, and, more specifically, is a three way connector having a "T" shape (e.g. a T-shaped fitting). FIG. 4 depicts a valve 218.

The fitting 214 includes a body portion 222 and three connector fittings 226 extending outwardly from the body portion 222. The valve 218 includes a body portion 230 and two connector fittings 227 extending outwardly from the body portion 230. In various embodiments, connector fittings 226 and 227 are substantially the same design. As described above, in various embodiments the body portion 222, 230 is constructed using a non-conductive polymeric material. For example, the body portion 222, 230 can be constructed from fluoropolymers including, but not limited to, PFA, ETFE, FEP, and PTFE.

In certain embodiments, body portion 222, 230 of FIGS. 3 and 4, each include an outer conductor portion 234, 238 that extends across the body portion 222, 230 between each of the connector fittings 226, 227 and is exposed at the outer surface of the body portions 222, 230. Surfaces that are included as a part of the outer conductor portion 234, 238 are indicated by reference numeral 242.

In some embodiments, the outer conductor portion 234, 238 is an outer layer of conductive polymer material, such as carbon loaded PFA, or other suitable conductive polymer, that is inlaid, via an overmolding process, into the non-conductive polymeric material of the body portion 222, 230 to form a continuous path of conductor material that is unitary with the body portion 222, 230 and that extends between each of the connector fittings 226, 227.

In certain embodiments, the outer conductor portion 234, 238 is formed as a strip of material running across the body portion 222, 230 that forms approximately 5%-10% of the exterior surface of the body portion 222, 230. In other embodiments the outer conductor portion 234, 238 of material running across the body portion 222, 230 forms approximately 11%-90% of the exterior surface of the body portion 222, 230. In still some other embodiments, the outer conductor portion 234, 238 is larger, forming approximately 40%-90% of the exterior surface or, in some embodiments, the entire exterior surface of the body portion 222, 230. In certain embodiments, the outer conductor portion 234, 238 may be formed of a thin conductive film at the surface of the body portion 222, 230 or incorporated on the thin film. In various embodiment, the thin film is wrapped around a portion of the body portion 222, 234 and extends between each of the connector fittings 226, 227.

Depicted in FIG. 4, each connector fitting 227 includes a shoulder region 246 that abuts the body portion 230 and extends outwardly to form a neck region 250, a threaded region 254, and a nipple portion 258. In various embodiments, the nipple portion 258 is suitable for accepting a tubing segment 164, which is shown in FIGS. 3 and 4 connected to each of the connector fittings 226, 227. In one or more embodiments, the connector fittings 227 include a nut 262 for tightening to the threaded region 254 to secure the tubing 164. In one or more embodiments, nut 262 has a generally cylindrical shape having an interior surface including threads 266 for mating with threaded region 254. In addition, nut 262 has an outer surface including ribs 270 which are symmetrically disposed about the outer surface for mating with a wrench or locking device for tightening or loosening of the nut 262 on the threaded region 254.

In one or more embodiments, the nut 262 is constructed entirely from a conductive polymeric material to form an outer conductor portion 274 that extends the length of the nut 262 between the tubing 164 and the body portion 230. For example, in certain embodiments the nut 262 is constructed entirely from loaded PFA, polyaniline, a combination of conductive polymers, or other suitable conductive polymer.

Additionally, in one or more embodiments, the connector fittings 227 include a conductor portion 278 that forms a portion of the shoulder region 246 and abuts the outer conductor portion 238 of the body portion 230. In certain embodiments, the conductor portion 278 extends from the shoulder region 246 to form a part of the threaded region 254. In some embodiments, the conductor portion 274 is a layer of conductive polymer material, such as carbon loaded PFA, or other suitable conductive polymer, that is inlaid into non-conductive polymeric material of the connector fittings 227 and nut 262.

As depicted in FIG. 4, when the operative component 210 is assembled with tubing 164, the conductor portion 274 of the nut 262 contacts the conductive portion 188 of tubing 164 at a forward portion 290 and forms a continuous path rearwardly from the forward portion 290 to an O-ring 294 positioned between the nut and the shoulder portion 246. In various embodiments, the O-ring 294 is constructed from conductive material, and transfers charge between the conductor portion 274 of the nut 262 and the connector fittings 227. For example, in one or more embodiments, the O-ring 294 is constructed from loaded PFA, polyaniline, a combination of conductive polymers, or other suitable conductive polymer.

As such, the nut 262 acts as a bridging component that forms and electrical pathway from the tubing 164 and transfers charge to the fitting connector 227, via the O-ring 294 and the shoulder region 246. From there, the outer conductor portion of the body portion 230 receives the charge which is transferred across the body portion 230 and to a conductor portion of the other tubing section 164 via a similar path by which the charge was received.

Those of skill in the art will appreciate that, while the example embodiments illustrated in FIGS. 3 and 4 have identical connector fittings 226, 227, in certain embodiments, the connector fittings 226, 227 may have varying sizes, may have various designs, such as step-down or step-up fittings, or may be located on various types of operative components 210.

Figure 5:
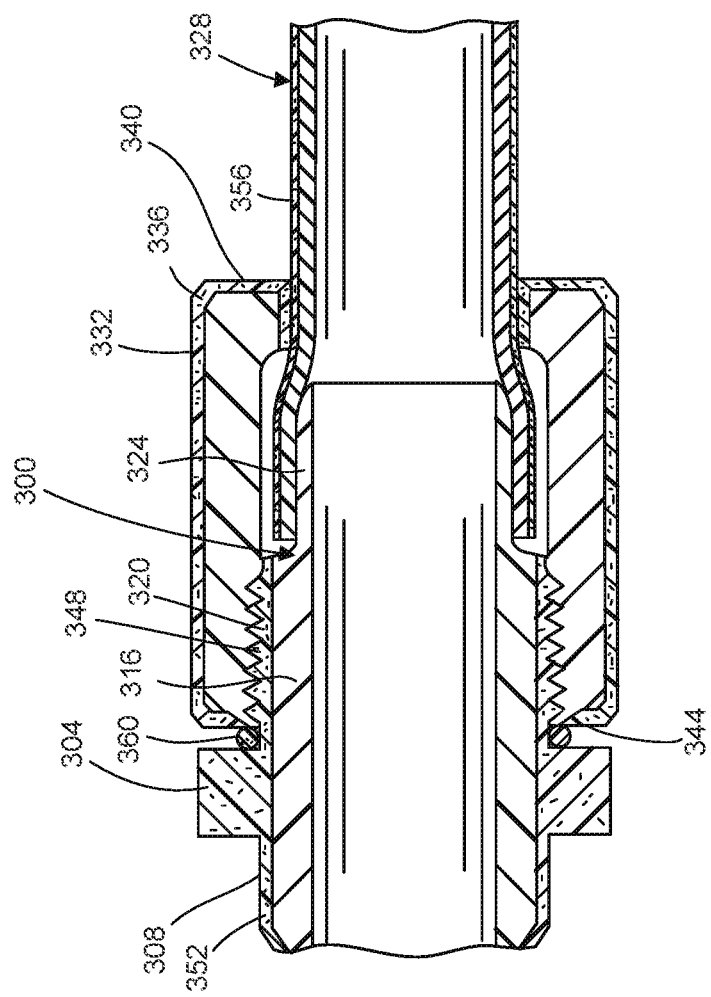
FIG. 5 depicts a cross sectional view of a tubing connector fitting and a tubing segment, according to one or more embodiments of the disclosure.
Figure 6:
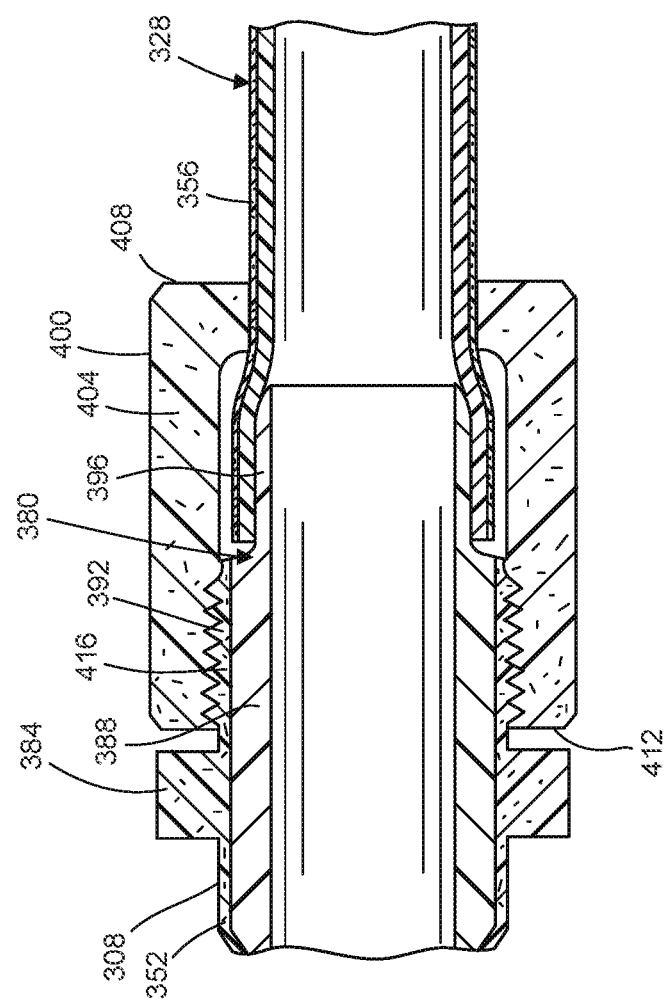
FIG. 6 depicts a cross-sectional view of a tubing connector fitting and a tubing segment, according to one or more embodiments of the disclosure.

FIGS. 5 and 6 depict example embodiments of connector fittings for operative components, according to one or more embodiments of the disclosure.

FIG. 5 depicts a connector fitting 300 that includes a shoulder region 304 that abuts a body portion 308 of an operative component and extends outwardly to form a neck region 316, a threaded region 320, and a nipple portion 324. Tubing 328 is received by the nipple portion 324, which, in certain embodiments, may be configured as a FLARETEK® fitting.

In one or more embodiments, the connector fitting 300 includes a nut 332 for tightening to the threaded region 320 to secure the tubing 328. Seen in FIG. 5, the nut 332 includes an outer conductor portion 336 formed from a layer of conductive polymer formed at the surface of the nut 332. The conductor portion 336 extends the length of the nut 332 between a forward portion 340 proximate the tubing 328 and a rearward portion 344 proximate the shoulder region 304.

Additionally, in one or more embodiments, the connector fitting 300 includes a conductor portion 348 that forms a portion of the shoulder region 304 and abuts the outer conductor portion 352 of the body portion 308. In certain embodiments, the conductor portion 348 extends from the shoulder region 304 to form a part of the threaded region 320.

In some embodiments, the conductor portions 336, 348 of the nut 332 and of the connector fitting 330 is a layer of conductive polymer material, such as carbon loaded PFA, or other suitable conductive polymer, that is inlaid via an overmolding process into the non-conductive polymeric material of the connector fittings 330 and the nut 332.

When the connector fitting 300 is assembled with tubing 328, the conductor portion 336 of the nut 332 contacts the conductive surface 356 of tubing 328 at the forward portion 340 and forms a continuous path rearwardly from the forward portion 340 to a conductive O-ring 360 positioned between the nut 332 and the shoulder portion 304. In various embodiments, the conductor portion 336 of the nut 332, has minimal or no direct contact with the conductor portion 348 of the connector fitting 300. As such, in various embodiments, the O-ring 360 ensures an electrical pathway between the conductor portion 336 the nut 332 and the conductor portion 348 that forms an electrical pathway from the tubing 328, along the nut 332, to the shoulder region 304 and to the outer conductor portion 352 of the body portion 308.

In various embodiments, the O-ring 360 is constructed from conductive material, such as loaded PFA, or other conductive polymer or elastomer, and transfers charge between the conductor portion 336 of the nut 332 and the connector fitting 300.

FIG. 6 depicts a connector fitting 380 similar to as described with reference to FIG. 5. For example, connector fitting 380 includes a shoulder region 384 that abuts a body portion 308 of an operative component and extends outwardly to form a neck region 388, a threaded region 392, and a nipple portion 396. Tubing 328 is received by the nipple portion 396, which, in certain embodiments, may be configured as a FLARETEK® fitting connector.

The connector fitting 380 includes a nut 400 for tightening to the threaded region 392 to secure the tubing 328. The nut 400 is constructed entirely from a conductive polymeric material, such as carbon loaded PFA. As such the nut 400 includes a conductor portion 404 extends the entirety of the nut 400 between a forward portion 408 proximate the tubing 328 and a rearward portion 412 proximate the shoulder region 384.

The connector fitting 380 includes a conductor portion 416 that forms a portion of the shoulder region 384, abuts the outer conductor portion 352 of the body portion 308. The conductor portion 416 of the connector fitting 380 extends from the shoulder region 384 to form a part of the threaded region 392.

When the connector fitting 380 is assembled with tubing 328, the conductor portion 404 of the nut 400 contacts the conductive surface 356 of tubing 328 at the forward portion 408 and forms a continuous path rearwardly from the forward portion 408 to the threaded region 392 mated with the nut 400. As such an electrical pathway is formed from the tubing 328, along the nut 400, to the threaded region 392 and to the outer conductor portion of the body portion 308. In one or more embodiments, as the conductor portion 404 of the nut 400 is entirely constructed from conductive polymer, no O-ring is required between the shoulder 384 and the nut 400, as electrical contact is sufficiently established between the conductor portion 404 of the nut 400 and the conductor portion 392 in the threaded region 416.

FIGS. 7A-7C depicts a connector fitting 420 similar to the connector fittings described with reference to FIGS. 5 and 6. For example, connector fitting 420 includes a shoulder region 424 that abuts a body portion 308 of an operative component and extends outwardly to form a neck region 428, a threaded region 432, and a nipple portion 436. Tubing 440 is received by the nipple portion 436, which, in certain embodiments, may be configured as a FLARETEK® fitting. The connector fitting 420 includes a nut 444 for tightening to the threaded region 432 to secure the tubing 440. In certain embodiments, the nut 444 is constructed entirely from a non-conductive polymeric material, such as PFA, PTFE, or other non-conductive fluoropolymer or polymer.

Depicted in FIGS. 7A and 7B, in one or more embodiments, the connector fitting 420 includes a conductive wrap 448 wrapped about a portion of the connector fitting 420 from the tubing 440 to the threaded region 432 proximate the shoulder region 424. In one or more embodiments, the conductive wrap 448 is a thin membrane or thin sheet of conductive polymeric material, or other suitable conductive material configured as a non-adhesive fluoropolymer conductive tape that secures to the exterior of the tubing 440 and threaded region 432.

Accordingly, when the assembled with tubing 440, the conductive wrap 448 forms a continuous path rearwardly from the forward portion 452 to the threaded region 432. As such an electrical pathway is formed from the tubing 440, along the conductive wrap 448, to the conductor portion 460 and to the outer conductor portion 352 of the body portion 308.

Figure 8A:
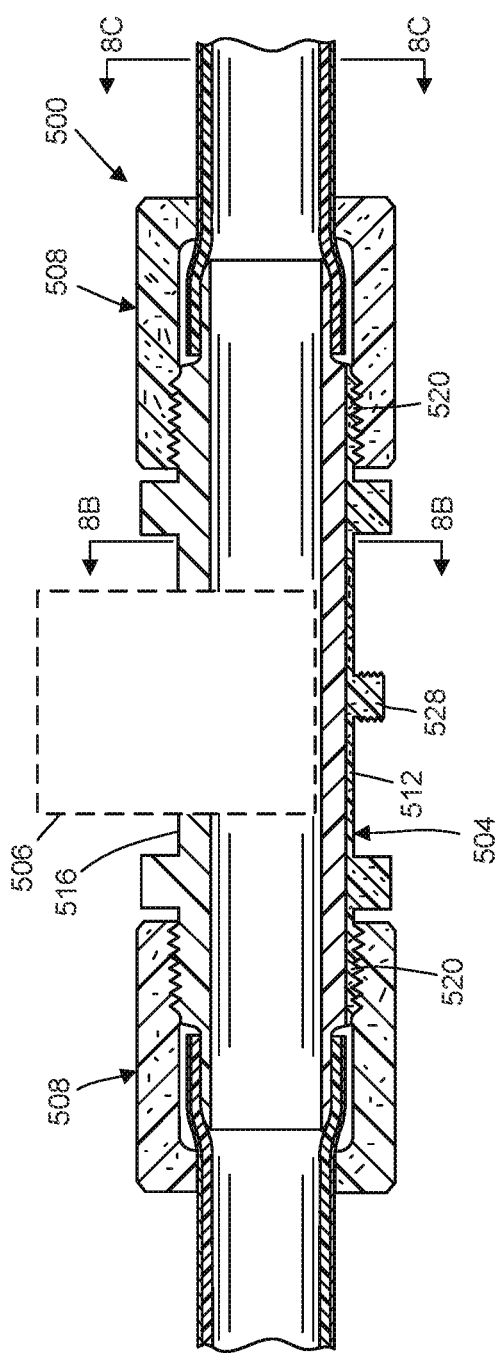
FIG. 8A depicts a cross-sectional view of an operative component, according to one or more embodiments of the disclosure.
Figure 8C:
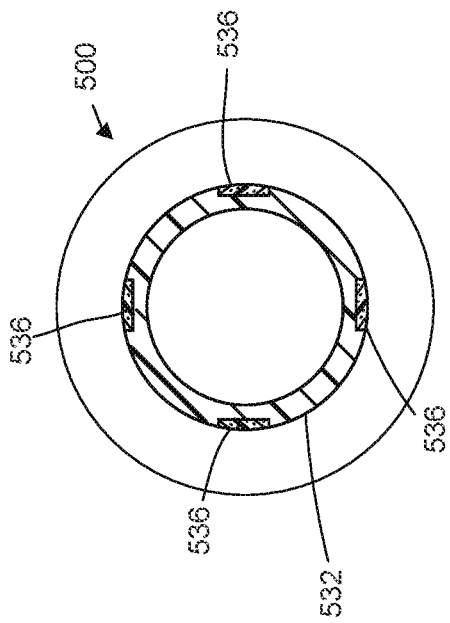
FIG. 8C depicts a cross-sectional view taken at line 8C of FIG. 8A.
Figure 8B:
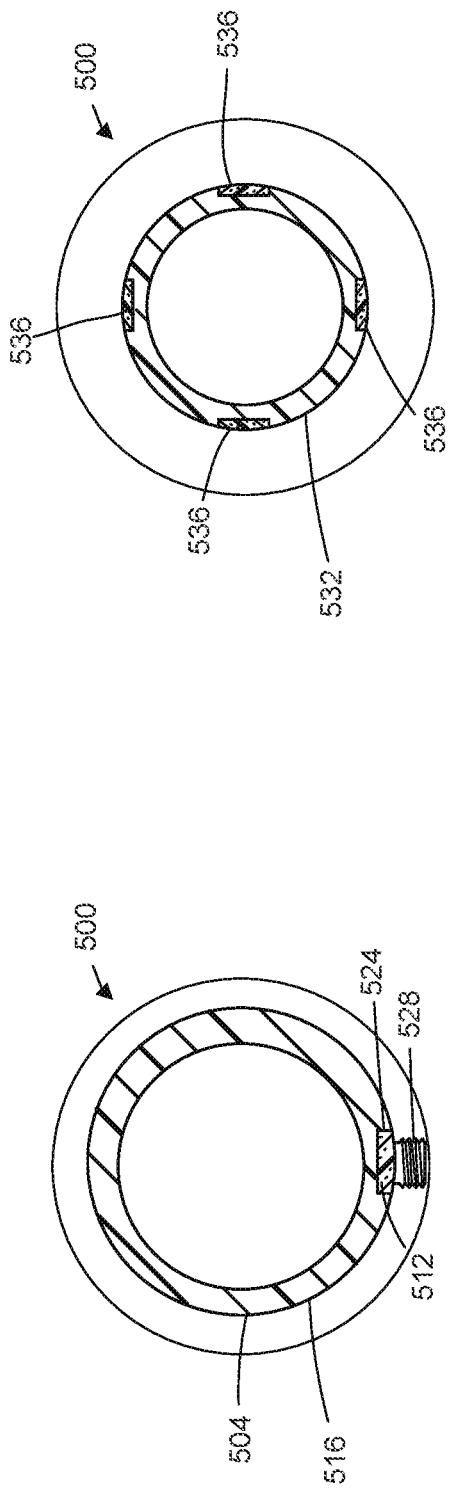
FIG. 8B depicts a cross-sectional view taken at line 8B of FIG. 8A.

FIGS. 8A, 8B, and 8C depict an operative component 500, according to one or more embodiments. Operative component 500 includes a body portion 504 and connector fittings 508. In one or more embodiments, the operative component 500 additionally includes an operative element 506 in the body portion. The operative element 506, in various embodiments, broadly includes suitable structure, electronics, or other materials for configuring the operative component 500 to perform various operations. For example, in some embodiments, the operational element 506 is a mixer, sensor, filter, pump, or other suitable element. As such, the operative component 500 is configurable to perform various different processes or tasks within a fluid circuit.

The body portion 504 includes a conductor portion 512 of conductive PFA positioned along the exterior surface 516 of the body portion 504. The conductor portion 512 extends between each of the connector fittings 508 and forms electrical contact between a conductive portion 520 in each of the connector fittings 508. Depicted in FIG. 8B, in one or more embodiments, the conductor portion 512 is a narrow strip of conductive material that is inlaid into a recess 524 formed in the non-conductive polymer material of the body portion 504. For example, in certain embodiments, the conductor portion 512 is a strip having a width of less than one centimeter. In some embodiments, the conductor portion 512 is a strip having a width in the range between one tenth of a centimeter to one centimeter. Described further below, with reference to FIGS. 9-11, the conductor portion 512 can be formed via an overmolding process where the body portion 504 is first partially formed from non-conductive fluoropolymer in a mold that defines the recess 524 or cavity in the exterior surface. A conductive fluoropolymer can then be overmolded into the recess 524 to form the conductor portion 512.

As described above, in various embodiments the operative component 500 is connected with tubing segments 532 at each of the connector fittings 508. The connector fittings 508 form an electrical pathway from conductive portions 536 of the tubing 532 through the connector portions 508 and across the conductor portion 512.

In various embodiments, as shown in FIG. 8B, the body portion 504 includes an attachment feature 528. In one or more embodiments, the attachment feature 528 is a piece of conductive material that is conductively connected with the conductor portion 512 for attachment to an external electrical contact. For example, attachment feature 528 can be connected to an electrical contact which is grounded in order to configure the operative component 500 for ESD mitigation. In one or more embodiments, the attachment feature 528 is a connector boss which is threaded for attachment to a nut or other threaded connector. In some embodiments, the attachment feature 528 is a tab, a threaded hole, or other suitable feature for connecting to an electrical contact. However, in certain embodiments, the attachment feature 528 can be configured for interference fit, snap fit, friction fit, or other method of fitting with an electrical contact.

Figure 9:
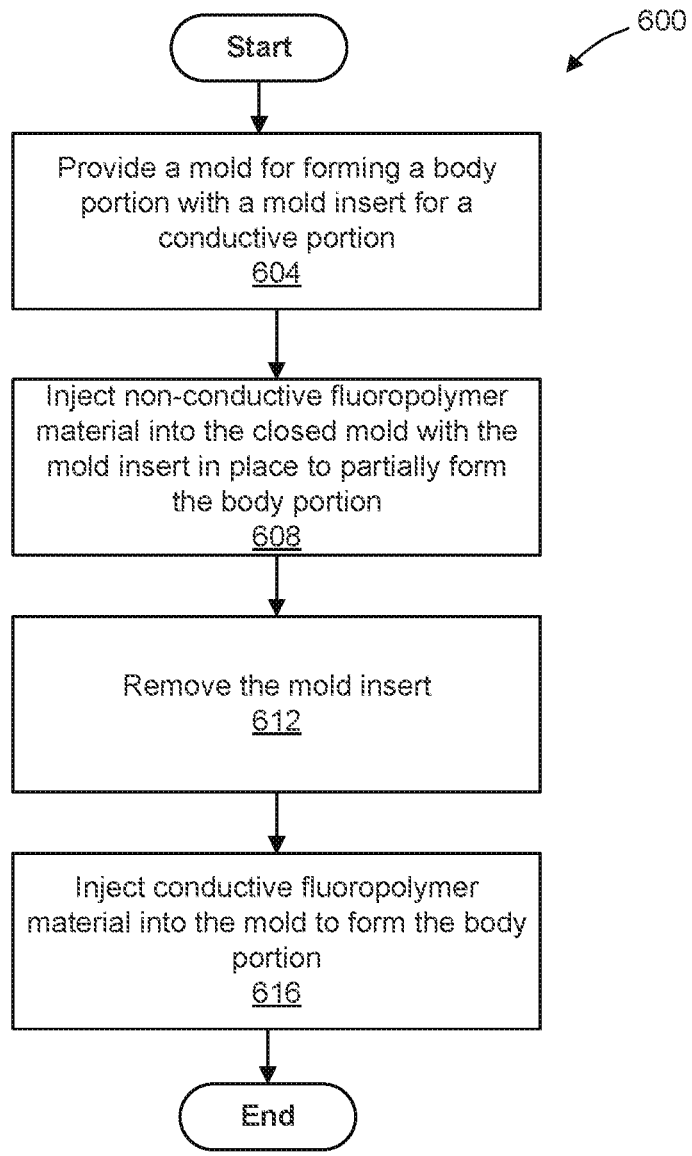
FIG. 9 depicts a flowchart diagram of a method of manufacturing an operative component, according to one or more embodiments of the disclosure.

FIG. 9 depicts a method 600 for forming an operative component, according to one or more embodiments. In operation 604, the method 600 includes providing a mold for making a body portion. In various embodiments, the mold includes one or more mold inserts therein which are positioned to form the outer conductor portion of the body portion. In operation 608, the method 600 includes injecting non-conductive fluoropolymer material into the mold to form or partially form the body portion. In operation 612, once the partially formed body portion is cooled, the mold inserts are removed. In various embodiments, once the mold inserts are removed, the partially formed body portion is returned to the mold.

In operation 616, the method 600 includes injecting additional overmolding material into the mold cavity to form the body portion. In various embodiments the additional overmolding material is conductive fluoropolymer. In one or more embodiments, the mold cavity corresponds to the specific portions which are being overmolded. For example, in certain embodiments, the mold inserts lay out the position and pathway of the outer conductor portion, as described above.

Once the body portion is initially molded and the mold inserts removed, as in operations 608 and 612, the result is a recess in the body portion having a negative image of the outer conductor portion. The additional overmolding material is injected into this recess, thereby forming the unitary body portion. Then the completed portion which comprises the body portion and the overmolded portion is removed.

In some embodiments the body portion cavity may have a cavity for forming a connector boss. In such a case, the first molded conductor portion is molded with the connector boss which is then inserted into the respective cavity the in the body portion cavity.

Figure 10:
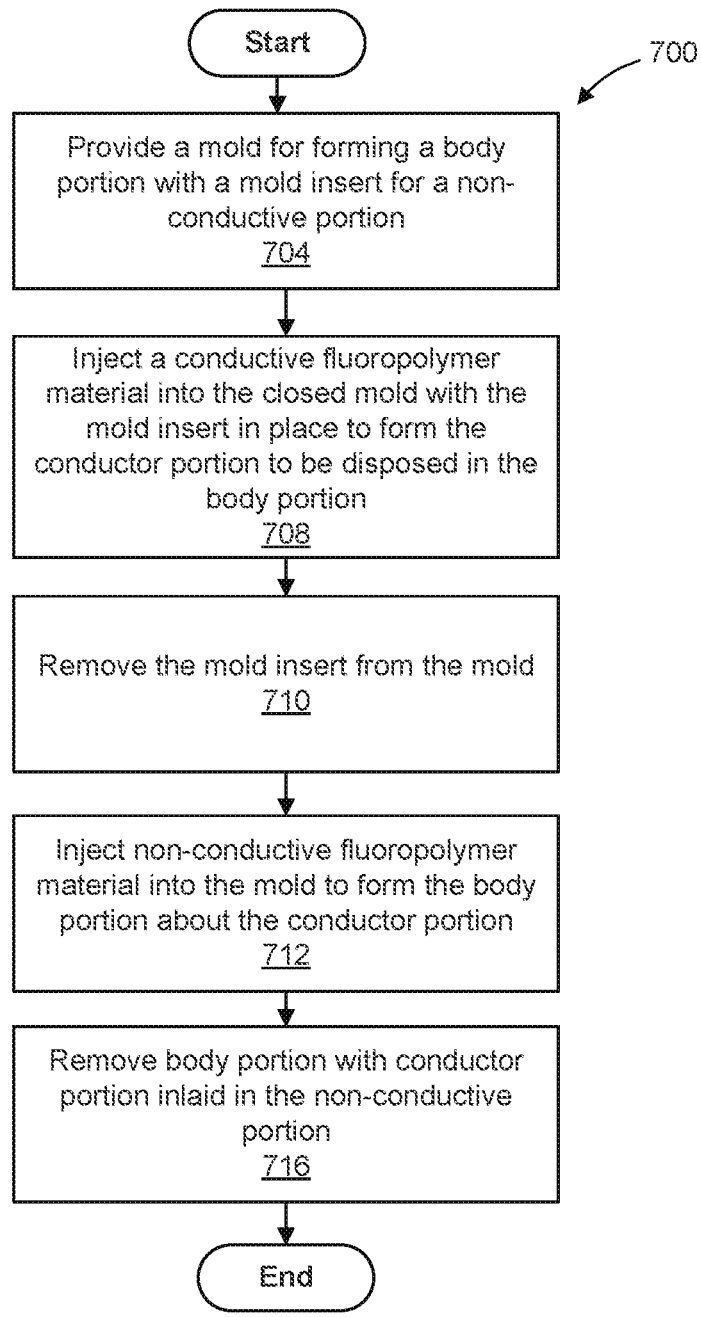
FIG. 10 depicts a flowchart diagram of a method of manufacturing an operative component, according to one or more embodiments of the disclosure.

FIG. 10 depicts a method 700 for forming an operative component, according to one or more embodiments. In operation 704, the method 700 includes providing a mold for making a body portion. In certain embodiments, it may be suitable to have the conductor portion molded first and then insert the conductor portion into the mold cavity for the body portion. As such, in operation 708, the method 700 initially includes injecting a conductive fluoropolymer material into the mold to form the conductor portion. In operation 712, the method 700 includes injecting a non-conductive fluoropolymer material into the mold to form the body portion about the pre-molded conductor portion. Once cooled, in operation 716, the body portion with the inlaid conductor portion is then removed from the mold.

Figure 11:
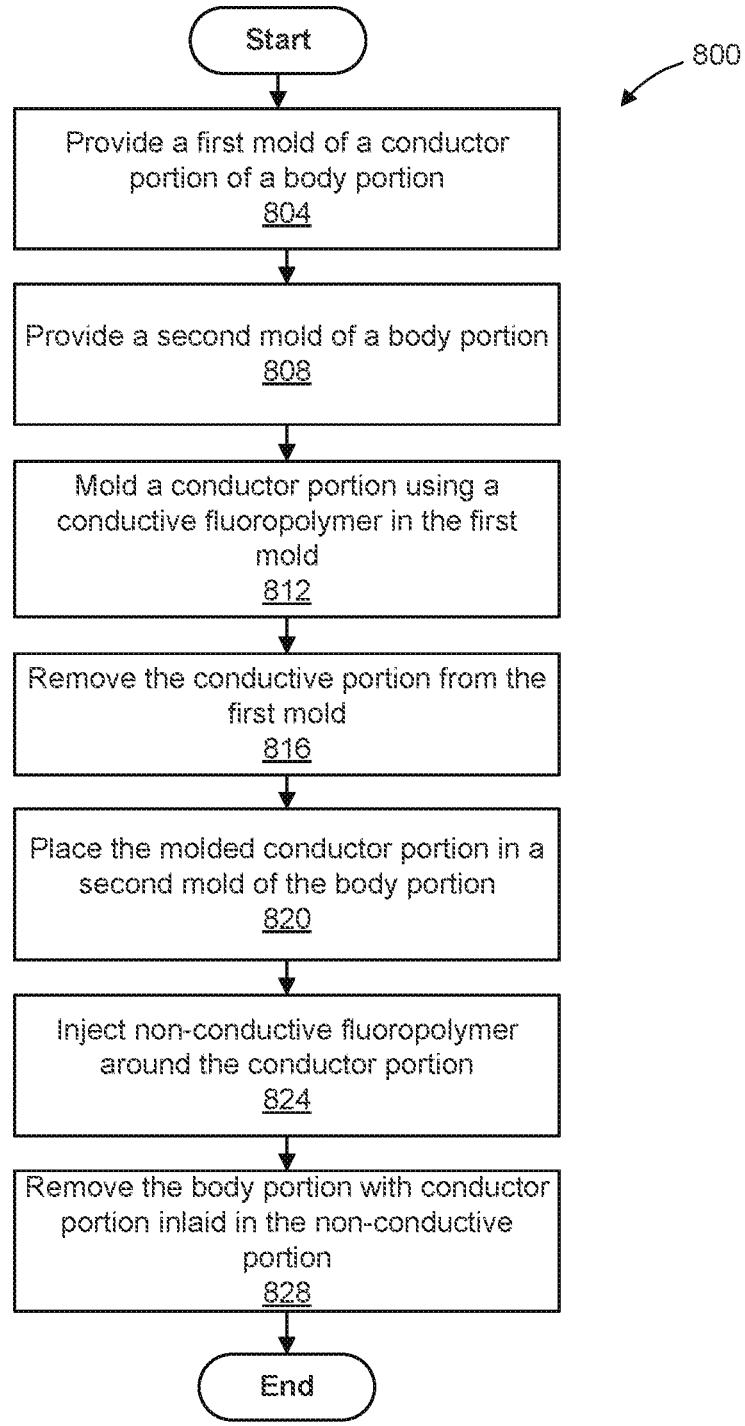
FIG. 11 depicts a flowchart diagram of a method of manufacturing an operative component, according to one or more embodiments of the disclosure.

FIG. 11 depicts a method 800 for forming an operative component, according to one or more embodiments. In operation 804, the method 800 includes providing a first mold of a conductor portion of a body portion. In operation 808, the method 800 includes providing a second mold of a body portion. In operation 812, the method 800 includes molding a conductor portion using a conductive fluoropolymer in the first mold. In operation 816, the method 800 includes removing the conductive portion from the first mold. In operation 820, the method 800 includes removing the conductive portion from the first mold. In operation 824, the method 800 includes injecting non-conductive fluoropolymer around the conductive portion. In operation 828, the method 800 includes removing the body portion with conductor portion inlaid in the non-conductive portion.

Figure 12:
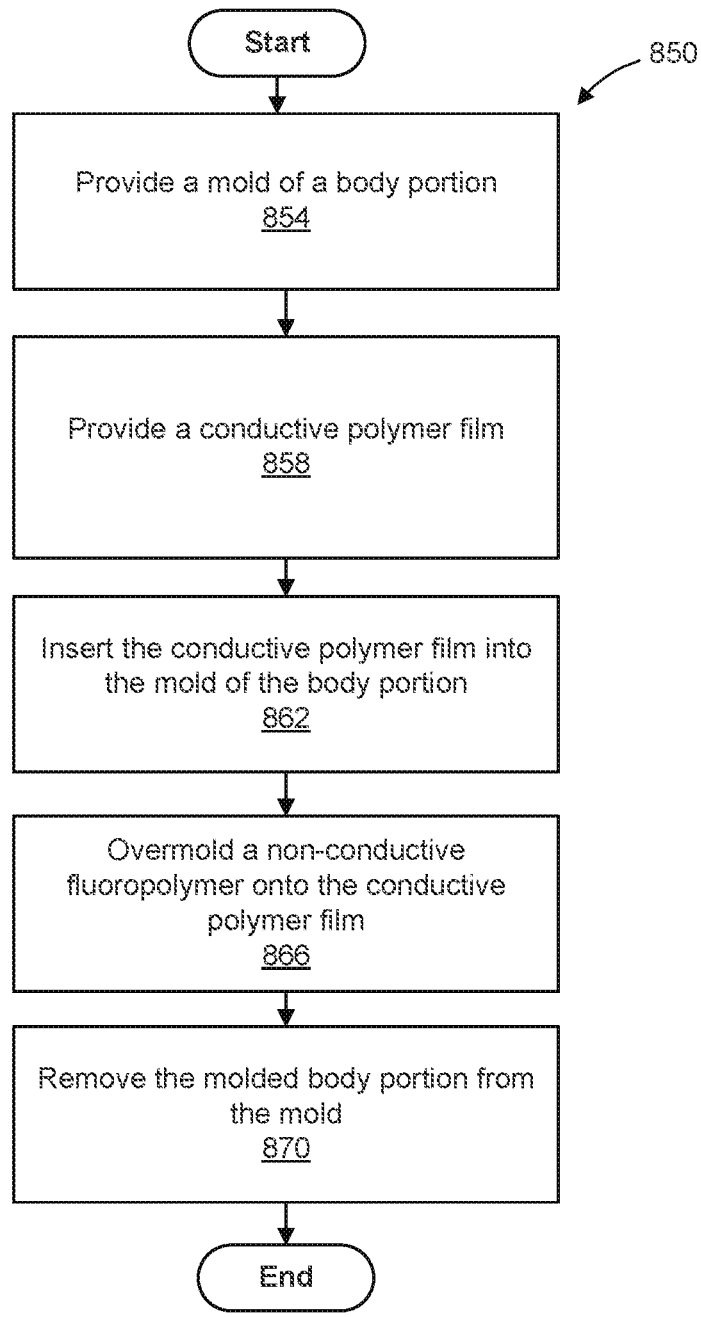
FIG. 12 depicts a flowchart diagram of a method of manufacturing an operative component, according to one or more embodiments of the disclosure.

FIG. 12 depicts a method 850 for forming an operative component, according to one or more embodiments. In operation 854, the method 850 includes providing a mold of a body portion. In operation 858, the method 850 includes providing a conductive polymer film. In operation 862, the method 850 includes inserting the conductive polymer film into the mold of the body portion. In operation 866, the method 850 includes overmolding a non-conductive polymer onto the conductive polymer film. In operation 870, the method 850 includes removing the molded body portion from the mold.

FIG. 13 depicts a schematic view of a method of forming an operative component, according to one or more embodiments. First a mold 904 is provided for making a body portion and/or a conductor portion. In some embodiments the base portion is first molded and is then put the same mold 904 with a mold insert removed. Then the mold 904 is closed and additional overmolding material 912 is injected into the mold cavity which corresponds to the specific portions which are being overmolded. Once cooled, the completed portion which comprises the body portion and the overmolded conductor portion is removed. In some embodiments, additional molds can be used for different stages of the overmolding process.

In some embodiments, the conductor portion is first molded and then is put into the same mold 904. Then the mold 904 is closed and additional overmolding material 912 is injected into the mold 904 to form the body portion 908.

In certain embodiments, a thin film 908 of conductive fluoropolymer is first inserted into the mold 904. Once inserted the body portion can be molded such that the film 908 forms an exterior surface of the body portion extending from connector to connector.

Additional description and illustration of overmolding is included in U.S. Pat. No. 6,428,729, and publication US20050236110 which are incorporated by reference, except for express definitions and patent claims contained therein.

The following clauses define particular aspects and embodiments of the invention.

Clause 1. A fluid circuit defining a flow path for a fluid from a fluid supply toward a process stage, the fluid circuit comprising: a plurality of operative components, each operative component comprising a body portion with a fluid flow passageway therethrough and a plurality of tubing connector fittings, the operative components connected by a plurality of tubing segments connecting to the components at their respective tubing connector fittings, the plurality of tubing segments and operative components providing the flow path through the fluid circuit; wherein each body portion comprises a non-conductive fluoropolymer portion, the non-conductive fluoropolymer portion defining the fluid passageway and extending to ends of each of the respective plurality of tubing connector fittings, each body portion further comprising an outer conductor that extends between each of the plurality of tubing connector fittings and that is unitary with the non-conductive fluoropolymer portion, the plurality of tubing segments each comprising a non-conductive fluoropolymer tubing portion and a strip of conductive polymer extending axially on and unitary with the non-conductive fluoropolymer tubing portion; wherein each of the connectors having a bridging component for conductively connecting the respective outer conductor of the body portion to the strip of conductive polymer of the tubing portion connected to the connector.

Clause 2. The fluid circuit of clause 1, wherein each of the pair of tubing connector fittings comprises a threaded nipple portion and a conductive nut attachable to the threaded nipple portion, and wherein the bridging component is the conductive nut.

Clause 3. The fluid circuit as in any one of the preceding clauses, wherein the plurality of operative components includes any one of a valve, a filter, a T-connector, an elbow connector, a pump, and a sensor.

Clause 4. The fluid circuit as in any one of the preceding clause, wherein at least one of the component body portions comprise an attachment feature that is conductively connected to the outer conductor of said respective component body portion.

Clause 5. A fluid circuit defining a flow path for a fluid from a fluid supply toward a process stage, the fluid circuit comprising: a plurality of operative components, each of the plurality of operative components comprising a body portion with a fluid flow passageway therethrough and a plurality of tubing connector fittings, the operative components interconnected by a plurality of tubing segments connecting to the components at their respective tubing connector fittings, the plurality of tubing segments and operative components providing the flow path through the fluid circuit; wherein each component body portion comprises a non-conductive fluoropolymer portion, the non-conductive fluoropolymer body portion defining the fluid flow passageway, each component body portion further comprising a conductive portion unitary with the non-conductive fluoropolymer portion and displaced outwardly from the fluid flow passageway, the conductive portion having an outwardly exposed connector to the conductive portion, each of the plurality of operative components conductively connected together.

Clause 6. The fluid circuit of clause 5, wherein each tubing segment has conductive portion comprising a fluoropolymer and each of the plurality of operative components are conductively connected together through the tubing segments.

Clause 7. The fluid circuit as in any one of clauses 5-6, wherein each of the plurality of operative components are conductively connected through conductive straps connecting to the respective conductor portions.

Clause 8. An operative fluid circuit component comprising: a body portion comprising a non-conductive fluoropolymer portion that defines a fluid flow path extending between an inlet portion and an outlet portion, the body portion further comprising a non-interior fluoropolymer conductor unitary with the non-conductive fluoropolymer portion, the non-interior fluoropolymer conductor extending between the inlet portion and outlet portion, at least the inlet portion configured for receiving a tubing end having a conductive portion and conductively connecting the non-interior fluoropolymer conductor portion to the conductive portion of the tubing end.

Clause 9. The operative fluid circuit component of clause 8, wherein the non-interior fluoropolymer conductor is configured as a strip having a width in the range of 0.1 centimeter to 1 centimeter wide.

Clause 10. The operative fluid circuit component as in any one of clauses 8-9, wherein the outlet portion comprises a spray nozzle.

Clause 11. The operative fluid circuit component as in any one of clauses 8-10, wherein the inlet portion comprises a male nipple portion and a nut, the male nipple portion having a threaded portion for engaging the nut, whereby the nut conductively engages the non-interior fluoropolymer conductor of the component body portion and the conductive portion of a tubing end in the inlet portion thereby conductively connecting said fluoropolymer conductor and conductive portion of the tubing end.

Clause 12. The operative fluid circuit component as in any one of clauses 8-11, wherein one of the non-interior fluoropolymer conductor and the non-conductive fluoropolymer portion is overmolded onto the other of the non-interior fluoropolymer conductor and the non-conductive fluoropolymer portion.

Clause 13. The operative fluid circuit component of any one of clauses 8-12, wherein the operative fluid circuit component is one of the set of a valve, a filter, a T-connector, an elbow connector, a pump, and a sensor.

Clause 14. The operative fluid circuit component of any one of clauses 8-12, wherein the body portion comprises an attachment feature for connection of a grounding strap to said component.

Clause 15. The operative fluid circuit component of clause 14 wherein the attachment feature comprises one of a threaded boss, a tab, and a threaded hole.

Clause 16. A fluid circuit defining a flow path for a fluid from a fluid supply toward a process stage, the fluid circuit comprising: a plurality of operative components, each operative component comprising a fluoropolymer body portion with a fluid flow passageway therethrough and a plurality of tubing connector fittings, the operative components connected by a plurality of tubing segments connecting to the components at their respective tubing connector fittings, the plurality of tubing segments and operative components providing the flow path through the fluid circuit;

wherein a path to ground is provided that extends through each operative component and each tubing segment.

Clause 17. The fluid circuit of clause 16 wherein the plurality of tubing segments each comprising a non-conductive fluoropolymer tubing portion and a strip of conductive polymer extending axially on and unitary with the non-conductive fluoropolymer tubing portion, and wherein each body portion comprises a conductive fluoropolymer portion extending from a pair of the plurality of tubing connector fittings.

Clause 18. The fluid circuit of as in any one of clauses 16 or 17, wherein each body portion comprises a non-conductive fluoropolymer portion defining the fluid passageway and extending to ends of each of the respective plurality of tubing connector fittings.

Clause 19. The fluid circuit as in any one of clauses 16-19, wherein each body portion comprises a non-conductive fluoropolymer portion defining the fluid passageway and extending to ends of each of the respective plurality of tubing connector fittings, the non-conductive fluoropolymer portion forming a gapless juncture with the conductive fluoropolymer portion.

Clause 20. An operative fluid circuit component comprising:

a body portion and at least two connector portions, the body portion comprising a non-conductive fluoropolymer portion that defines a fluid flow path extending between the at least two connector portions, the body portion further comprising a non-interior fluoropolymer conductor extending between the at least two connector portions, each connector portion configured for receiving a tubing end having a conductive portion and conductively connecting the non-interior fluoropolymer conductor portion to the conductive portion of the tubing end, one of the non-conductive fluoropolymer portion and the fluoropolymer conductor portion overmolded on the other of the non-conductive fluoropolymer portion and the fluoropolymer conductor portion.

Clause 21. The fluid circuit as in any one of the preceding clauses wherein the connector fitting includes a conductive wrap.

Clause 22. The fluid circuit as in any one of the preceding clauses wherein the conductive polymer of the tubing segment is conductively connected to the conductive pathway of the body portion at the tubing connector fitting.

Clause 23. The fluid circuit as in any one of the preceding clauses wherein the connector fitting includes a nut that is constructed of conductive polymeric material.

Clause 24. The fluid circuit as in any one of the preceding clauses wherein the conductive portion forms 5-10% of the exterior surface of the body portion.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A fluid circuit defining a flow path for a fluid from a fluid supply toward a process stage, the fluid circuit comprising:

a plurality of operative components, each operative component comprising a body portion with a fluid flow passageway therethrough and a plurality of tubing connector fittings, the operative components connected by a plurality of tubing segments connecting to the components at their respective tubing connector fittings, the plurality of tubing segments and operative components providing the flow path through the fluid circuit;

wherein each body portion comprises a non-conductive fluoropolymer portion, the non-conductive fluoropolymer portion defining the fluid passageway and extending to ends of each of the respective plurality of tubing connector fittings, each body portion further comprising an outer conductor that extends between each of the plurality of tubing connector fittings and that is unitary with the non-conductive fluoropolymer portion, the plurality of tubing segments each comprising a non-conductive fluoropolymer tubing portion and a strip of conductive polymer extending axially on and unitary with the non-conductive fluoropolymer tubing portion;

wherein each of the connectors having a bridging component for conductively connecting the respective outer conductor of the body portion to the strip of conductive polymer of the tubing portion connected to the connector.

2. The fluid circuit of claim 1, wherein each of the pair of tubing connector fittings comprises a threaded nipple portion and a conductive nut attachable to the threaded nipple portion, and wherein the bridging component is the conductive nut.

3. The fluid circuit of claim 1, wherein the plurality of operative components includes any one of a valve, a filter, a T-connector, an elbow connector, a pump, and a sensor.

4. The fluid circuit of claim 1, wherein at least one of the component body portions comprise an attachment feature that is conductively connected to the outer conductor of said respective component body portion.

5. The fluid circuit of claim 1, further comprising a conductive O-ring.

6. The fluid circuit of claim 5, wherein the conductive O-ring comprises a conductive fluoropolymer.

7. The fluid circuit of claim 6, wherein the conductive fluoropolymer is a conductive perfluoroalkoxy alkane (PFA) fluoropolymer.

8. The fluid circuit of claim 1, further comprising a nut comprising conductive fluoropolymer to electrically connect a tubing segment to an operative component.

9. The fluid circuit of claim 8, wherein the conductive fluoropolymer is a conductive perfluoroalkoxy alkane (PFA) fluoropolymer.

10. The fluid circuit of claim 9, wherein the conductive PEA is a PFA comprising conductive carbon.

11. A fluid circuit comprising:
- a plurality of operative components, each operative component comprising a body portion with a fluid flow passageway therethrough, each operative component further comprising an electrical connector connectable to ground to reduce electrostatic discharge;
- a plurality of tubing segments, each of the plurality tubing segment comprising an external conductive polymer stripe; and
- a plurality of conductive tubing connector fittings connecting the plurality of tubing segments with the plurality of operative components, wherein each of the plurality of conductive tubing connector fittings comprise:
  - a nipple to receive a respective tubing segment of the plurality of tubing segments; and
  - a conductive nut to secure the respective tubing segment of the plurality of tubing segments to the nipple, wherein the conductive nut electrically connects the external conductive polymer stripe of the tubing segment with the electrical connector of the operative component.

12. The fluid circuit of claim 11, further comprising a conductive O-ring contacting the conductive nut.

13. The fluid circuit of claim 12, wherein the conductive O-ring comprises a conductive fluoropolymer.

14. The fluid circuit of claim 13, wherein the conductive fluoropolymer comprises a conductive carbon loaded perfluoroalkoxy alkane (PFA).

15. The fluid circuit of claim 11, wherein the conductive nut comprises a conductive carbon loaded perfluoroalkoxy alkane (PFA).

* * * * *